(12) United States Patent
Quandt et al.

(10) Patent No.: US 10,994,826 B2
(45) Date of Patent: May 4, 2021

(54) TEMPERATURE SENSITIVE SELF ACTUATED HEAT BOUNDARY LAYER CONTROL DEVICE

(71) Applicant: The Boeing Company, Chicago, IL (US)

(72) Inventors: Gene Arthur Quandt, Edgewood, WA (US); Matthew James Hemsath, Everett, WA (US); Tracy L. Duvall, Des Moines, WA (US); David Brian Christman, Ravensdale, WA (US); Frederick T. Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 1138 days.

(21) Appl. No.: 15/404,810

(22) Filed: Jan. 12, 2017

(65) Prior Publication Data

US 2018/0194456 A1 Jul. 12, 2018

(51) Int. Cl.
*B64C 3/36* (2006.01)
*B64C 23/06* (2006.01)
*B64D 27/18* (2006.01)
*B64C 9/18* (2006.01)

(52) U.S. Cl.
CPC ............. *B64C 3/36* (2013.01); *B64C 9/18* (2013.01); *B64C 23/06* (2013.01); *B64D 27/18* (2013.01)

(58) Field of Classification Search
CPC .... B64C 3/26; B64C 3/48; B64C 3/52; B64C 2003/148; B64C 21/00; B64C 21/08; B64C 21/10; B64C 23/00; B64C 2230/00; B64C 9/18; B64D 2033/0226
See application file for complete search history.

(56) References Cited

U.S. PATENT DOCUMENTS

| | | | | |
|---|---|---|---|---|
| 2,943,828 A | * | 7/1960 | Van Driest | B64C 21/10 244/117 A |
| 5,209,438 A | * | 5/1993 | Wygnanski | B64C 23/00 244/203 |
| 5,755,408 A | * | 5/1998 | Schmidt | B64C 21/00 244/204 |
| 6,131,853 A | * | 10/2000 | Bauer | B64C 23/00 244/113 |
| 6,484,971 B2 | * | 11/2002 | Layukallo | B64C 9/00 244/130 |
| 6,837,465 B2 | * | 1/2005 | Lisy | B64C 23/06 244/204.1 |
| 7,028,954 B2 | * | 4/2006 | Van Dam | B64C 3/44 244/204 |

(Continued)

OTHER PUBLICATIONS

Boddy et al., "A Summary and Analysis of Data on Dive-Recovery Flaps," National Advisory Committee for Aeronautics, Research Memorandum, NARCA RM No. A7f09, Sep. 1947, 42 pages.

*Primary Examiner* — Benjamin P Lee
(74) *Attorney, Agent, or Firm* — Yee & Associates, P.C.

(57) ABSTRACT

A method and apparatus for a boundary layer control device located relative to an aircraft structure. The boundary layer control device has a stowed position and a deployed position. The boundary layer control device moves from the stowed position to the deployed position. A thickness of a boundary layer for the aircraft structure increases in a manner that increases a distance of a heat flow field from the aircraft structure during operation of the aircraft.

27 Claims, 9 Drawing Sheets

(56) References Cited

U.S. PATENT DOCUMENTS

| | | | | |
|---|---|---|---|---|
| 7,878,457 B2* | 2/2011 | Narramore | | B64C 23/06 244/200.1 |
| 7,958,733 B2* | 6/2011 | Turner | | F02K 1/386 60/770 |
| 8,052,388 B2* | 11/2011 | McCaffrey | | F01D 9/02 416/23 |
| 9,002,484 B2* | 4/2015 | Hyde | | B64C 23/005 700/47 |
| 9,174,723 B2* | 11/2015 | Madsen | | B64C 9/02 |
| 9,587,632 B2* | 3/2017 | Dimascio | | F03G 7/06 |
| 9,671,030 B2* | 6/2017 | Dimascio | | F16J 15/445 |
| 9,764,824 B2* | 9/2017 | Song | | F15D 1/004 |
| 9,937,963 B2* | 4/2018 | Sandgren | | B62D 35/02 |
| 10,737,772 B2* | 8/2020 | Langenbacher | | B64C 23/06 |
| 2004/0129838 A1* | 7/2004 | Lisy | | B64C 3/58 244/204.1 |
| 2006/0267376 A1* | 11/2006 | McKnight | | B60K 11/085 296/180.5 |
| 2013/0255248 A1* | 10/2013 | Dimascio | | F03G 7/06 60/527 |
| 2013/0255796 A1* | 10/2013 | Dimascio | | F03D 1/0675 137/334 |
| 2013/0255931 A1* | 10/2013 | Arnett | | F28F 27/00 165/287 |
| 2014/0027538 A1* | 1/2014 | Webster | | F02K 1/06 239/265.43 |
| 2014/0331665 A1 | 11/2014 | Shivashankara et al. | | |
| 2015/0129715 A1* | 5/2015 | Madsen | | B64C 7/00 244/99.8 |
| 2015/0307202 A1* | 10/2015 | Crouch | | G01M 9/065 73/147 |
| 2016/0272301 A1* | 9/2016 | Shmilovich | | B64C 21/04 |
| 2017/0066519 A1* | 3/2017 | Mabe | | F02K 1/10 |
| 2017/0314530 A1* | 11/2017 | Herrig | | F03D 1/0641 |
| 2020/0231273 A1* | 7/2020 | Sullivan | | B64C 23/005 |

* cited by examiner

TEMPERATURE SENSITIVE SELF ACTUATED HEAT BOUNDARY LAYER CONTROL DEVICE

BACKGROUND INFORMATION

1. Field

The present disclosure relates generally to aircraft and, in particular, to a method and apparatus for controlling a heat boundary layer.

2. Background

Presently, aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

For example, composite materials are used to form fuselages, wings, stabilizers, and other aircraft structures. Composites, however, may be more sensitive to extreme temperatures from aircraft engines. During operation of the aircraft, a flap may be extended so that the surface of the flap is located behind the exhaust coming from the nozzle of the aircraft engine. The nozzle may cause a heat flow field, with extreme temperatures, to flow over the surface of the flap. Extreme temperatures are temperatures that heat the flap in a manner that causes inconsistencies to occur in an aircraft structure, such as a flap.

The inconsistencies may reduce aerodynamic efficiency for the flap. As a result, increased maintenance, reworking or replacing parts for the flap may be needed to maintain a desired level of aerodynamic efficiency for the flap.

Therefore, it would be desirable to have a method and apparatus that take into account at least some of the issues discussed above, as well as other possible issues. For example, it would be desirable to have a method and apparatus that overcome a technical problem with heating of composite parts to extreme temperatures during operation of an aircraft.

SUMMARY

An example of the present disclosure provides for an apparatus. The apparatus comprises an aircraft structure on an aircraft and a boundary layer control device located relative to the aircraft structure. The boundary layer control device has a stowed position and a deployed position. The boundary layer control device moves from the stowed position to the deployed position. A thickness of a boundary layer for the aircraft structure increases in a manner that increases a distance of a heat flow field from the aircraft structure during operation of the aircraft.

Another example of the present disclosure provides an aircraft heat control system for controlling the boundary layer. The aircraft heat control system comprises an engagement portion of the boundary layer control device connected to the aircraft structure and an articulating portion of the boundary layer control device extending from the engagement portion. The articulating portion is comprised of a shape memory alloy that moves from a stowed position towards a deployed position when the heat flow field flows over the articulating portion and the temperature of the articulating portion exceeds a threshold temperature. When in the deployed position, the articulating portion increases the thickness of the boundary layer that causes an increased distance of the heat flow field from the aircraft structure.

Yet another example of the present disclosure provides a method for controlling a boundary layer flowing over an aircraft structure. The method comprises moving a boundary layer control device from a stowed position to a deployed position when a heat flow field is present adjacent to the aircraft structure during operation of the aircraft. The deployed position of the boundary layer control device increases the thickness of the boundary layer for the aircraft structure that increases a distance of the heat flow field from the aircraft structure during operation of the aircraft.

Still another embodiment of the present disclosure provides an apparatus. The apparatus comprises an aircraft structure of an aircraft and a boundary layer control device located relative to the aircraft structure. The boundary layer control device has a stowed position and a deployed position, such that the boundary layer control device moves from the stowed position to the deployed position. The thickness of the boundary layer for the aircraft structure increases in a manner that increases the distance of a heat flow field from the aircraft structure during operation of the aircraft. The boundary layer control device moves into the deployed position when the temperature of the boundary layer control device exceeds a threshold temperature and preforms an aerodynamic function in the deployed position.

The features and functions can be achieved independently in various examples of the present disclosure, or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that one solution may include using materials with a higher temperature resistance in locations on the aircraft that may be exposed to heat flow fields which cause extreme temperatures that affect composite and bonded materials. The illustrative examples recognize and take in to account that this approach, however, may increase the complexity of aircraft structures to be greater than desired. The illustrative examples recognize and take into account that the increased complexity may increase the cost and time needed to manufacture aircraft, perform maintenance on aircraft, or both.

Thus, the illustrative examples provide a method and apparatus for deflecting a heat boundary layer away from an aircraft structure. In one example, an aircraft structure is on an aircraft. A boundary layer control device is located relative to the aircraft structure. The boundary layer control device has a stowed position and a deployed position. The boundary layer control device moves from the stowed position to the deployed position, such that a thickness of a boundary layer for the aircraft structure increases in a manner that increases the distance of a heat flow field from the aircraft structure during operation of the aircraft.

Figure 1:
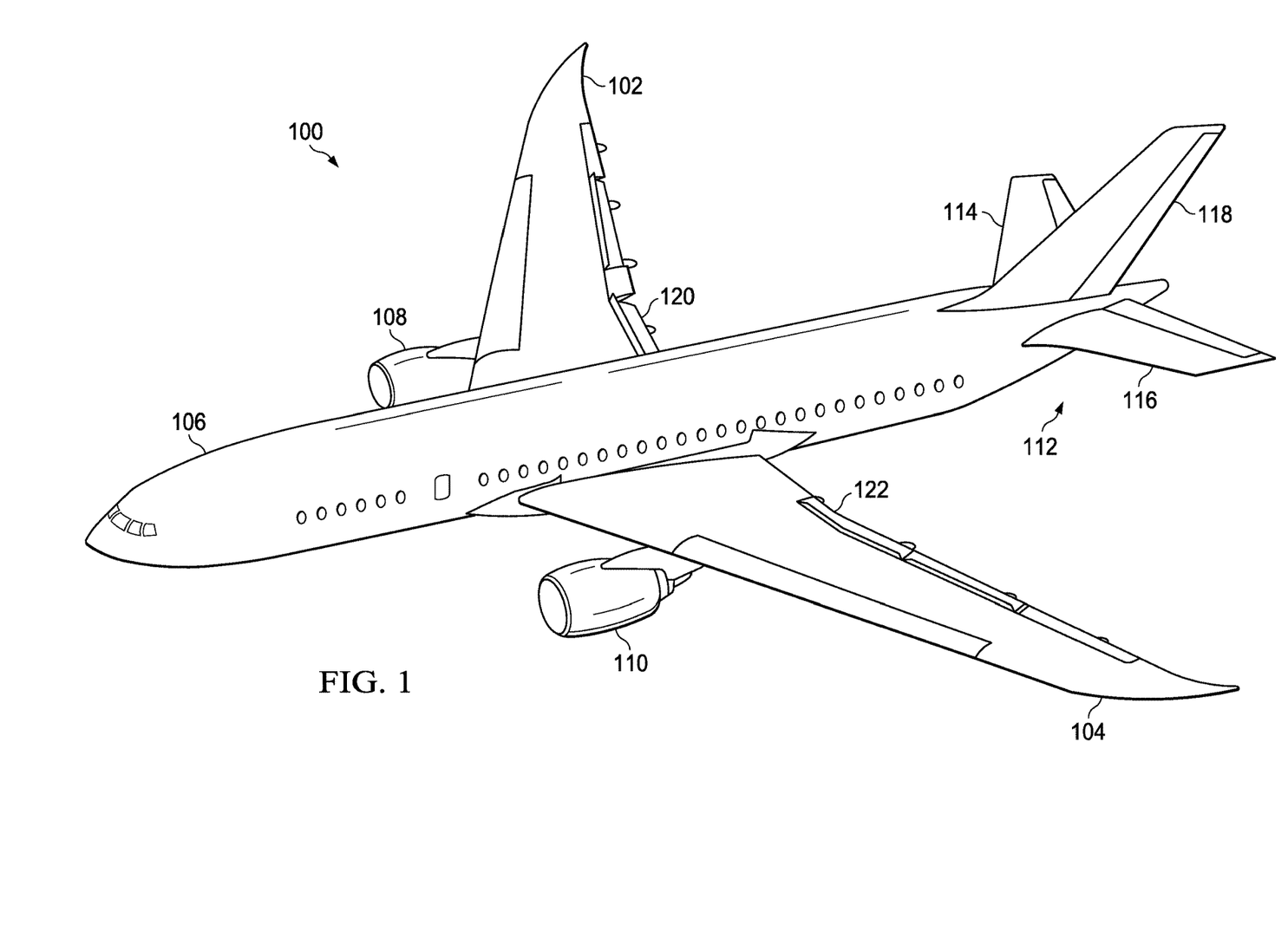
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to body 106. Aircraft 100 includes aircraft engine 108 attached to wing 102 and aircraft engine 110 attached to wing 104.

Body 106 has tail section 112. Horizontal stabilizer 114, horizontal stabilizer 116, and vertical stabilizer 118 are attached to tail section 112 of body 106.

In the illustrative example, aircraft engine 108 and aircraft engine 110 are positioned such that heat flow fields (not shown) generated by aircraft engine 108 and aircraft engine 110 flow over the surfaces of flap 120 and flap 122, respectively. When flap 120 and flap 122 include or are formed from composite materials, the heat flow fields generated by aircraft engine 108 and aircraft engine 110 may cause undesired inconsistencies in flap 120 and flap 122. These undesired inconsistencies may take various forms selected from at least one of structural degradation, a crack, debonding, or other types of undesired inconsistency.

In another illustrative example, flap 120 and flap 122 may be bonded aluminum structures. Heat flow fields generated may cause debonding in these bonded aluminum structures.

Aircraft 100 is an example of an aircraft in which an aircraft heat control system (not shown) may be implemented in accordance with an illustrative example. The aircraft heat control system increases the distance of the heat flow fields from the surfaces of flap 120 and flap 122. The increased distance of the heat flow fields from these surfaces decreases the temperatures for flap 120 and flap 122.

Figure 2:
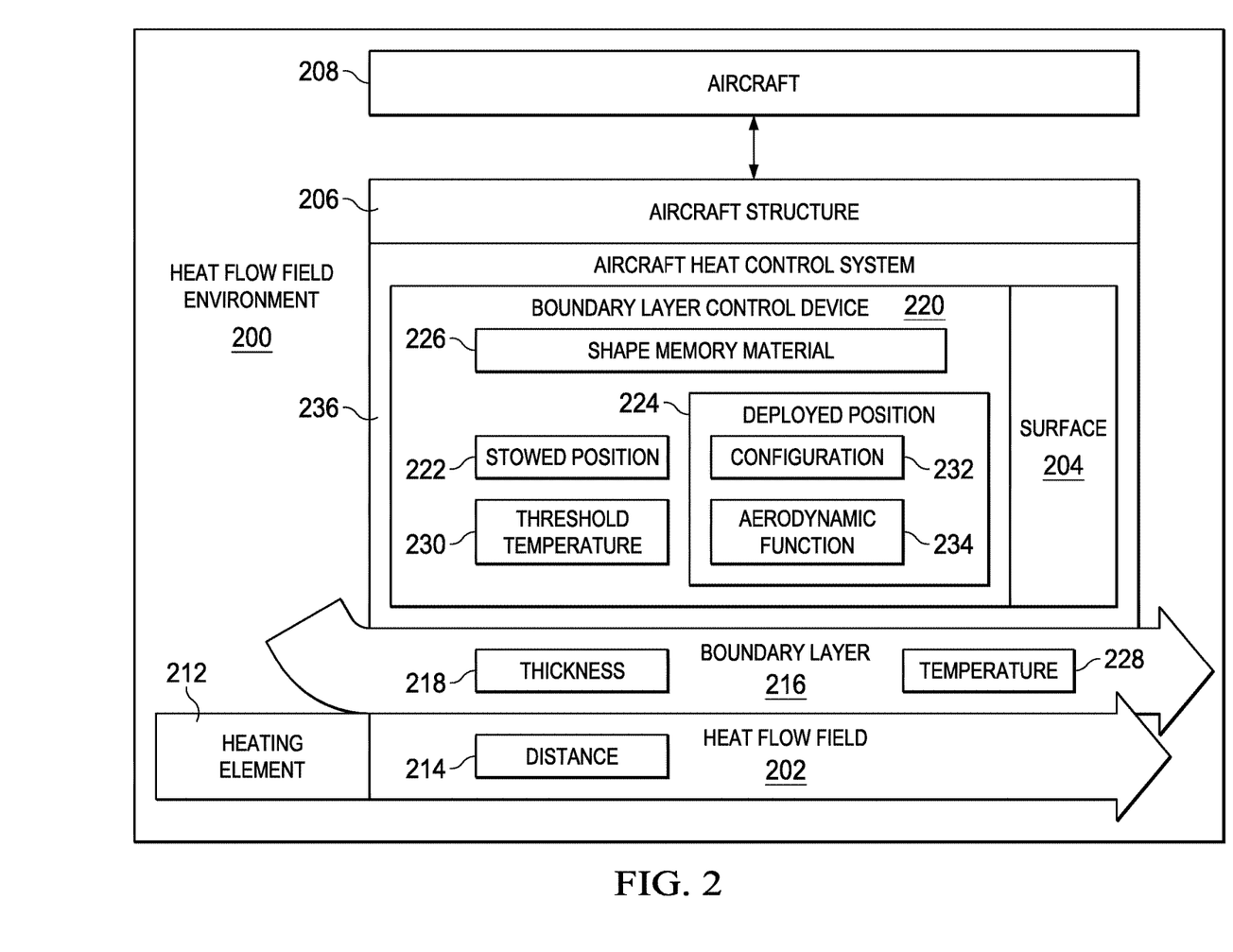
FIG. 2 is an illustration of a block diagram of an aircraft operating environment in accordance with an illustrative example.

Turning now FIG. 2, an illustration of a block diagram of an aircraft operating environment is depicted in accordance with an illustrative example. In this illustrative example, heat flow field environment 200 is an environment in which heat flow field 202 flows over surface 204 of aircraft structure 206 during operation of aircraft 208. Heat flow field 202 is generated by heating element 212. Heating element 212 may be selected from one of an air brake, a vent outflow, or an aircraft engine In this example, aircraft 100 in FIG. 1 is an example of a physical implementation of aircraft 208 shown in block form in this figure. Flap 120 and flap 122 in FIG. 1 are examples of physical implementations of aircraft structure 206 shown in block form in FIG. 2. In the illustrative example, aircraft structure 206 is selected from one of a flap, a flaperon, a vertical stabilizer, an aileron, a spoiler, a horizontal stabilizer, or some other suitable type of aircraft structure.

Heat flow field 202 is generated by operation of heating element 212. Aircraft engine 108 and aircraft engine 110 in FIG. 1 are examples of physical implementations of heating element 212 shown in block form in this figure.

In this illustrative example, heat flow field 202 has distance 214 to a surface of aircraft structure 206. As depicted, distance 214 is set by boundary layer 216 flowing over surface 204 of aircraft structure 206.

Aircraft heat control system 236 is used to control the effects of heat flow field 202 on aircraft structure 206. In this illustrative example, aircraft heat control system 236 comprises boundary layer control device 220.

As depicted in FIG. 2, boundary layer control device 220 is located relative to aircraft structure 206. Boundary layer control device 220 has stowed position 222 and deployed position 224. In this illustrative example, boundary layer control device 220 moves from stowed position 222 to deployed position 224, such that thickness 218 of boundary layer 216 for aircraft structure 206 increases in a manner that increases distance 214 of heat flow field 202 from aircraft structure 206 during operation of aircraft 208.

In the illustrative example, boundary layer control device 220 is comprised of shape memory material 226. Shape memory material 226 may be selected from at least one of a shape memory alloy, a copper-aluminum-nickel, a nickel titanium, a nitinol, a shape memory ceramic, or some other suitable type of material.

As used herein, the phrase "at least one of", when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations of items.

As depicted in FIG. 2, boundary layer control device 220 is configured to move to deployed position 224 from stowed position 222 when temperature 228 of boundary layer control device 220 exceeds threshold temperature 230.

Further, boundary layer control device 220 in deployed position 224 has configuration 232 that performs aerodynamic function 234. In this illustrative example, aerodynamic function 234 is selected from a group comprising increasing a local lift coefficient, shifting a local aerodynamic center of pressure, altering a local pitching moment coefficient, increasing a local drag coefficient, and other suitable functions.

Figure 3:
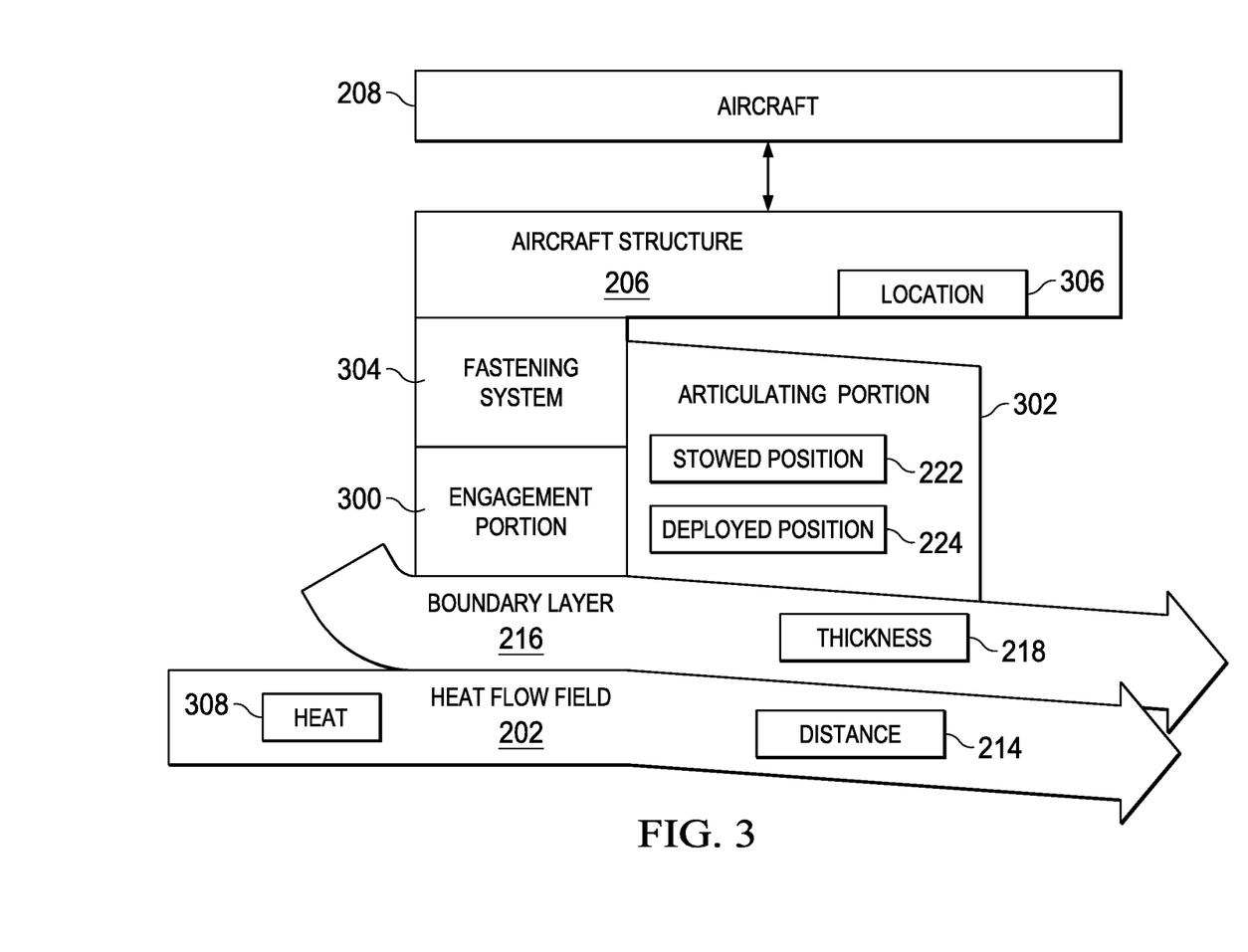
FIG. 3 is an illustration of a block diagram of a boundary layer control device in accordance with an illustrative example.

Turning next to FIG. 3, an illustration of a block diagram of a boundary layer control device is depicted in accordance with an illustrative example. In the illustrative examples, the same reference numeral may be used in more than one figure. This reuse of a reference numeral in different figures represents the same element in the different figures.

In this depicted example, an example of components that may be present in boundary layer control device 220 are shown. As depicted, engagement portion 300 and articulating portion 302 are components that form boundary layer control device 220.

In this illustrative example, engagement portion 300 is associated with aircraft 208. As depicted engagement portion 300 is associated with aircraft structure 206 but may be associated with other aircraft structures for aircraft 208.

When one component is "associated" with another component, the association is a physical association. For example, a first component, engagement portion 300, may be considered to be physically associated with a second component, aircraft structure 206. This physical association can be shown by at least one of the first component being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

For example, engagement portion 300 may be connected to aircraft structure 206 by at least one of a bonding system, a fastening system, or some other suitable mechanism. In this particular example, fastening system 304 is used to physically associate engagement portion 300 with aircraft structure 206. Fastener system 304 may include at least one of a nut and bolt, a screw, and adhesive, or some other suitable type of fastening mechanism.

As depicted, articulating portion 302 extends from engagement portion 300. Articulating portion 302 is configured to move between stowed position 222 and deployed position 224.

In this example, boundary layer 216 flows over aircraft structure 206. Boundary layer 216 is a layer of air. As depicted, articulating portion 302 is positioned relative to aircraft structure 206 such that articulating portion 302 in deployed position 224 increases thickness 218 of boundary layer 216 flowing over aircraft structure 206 in location 306 on aircraft structure 206 where heat 308 from heat flow field 202 is undesirable.

The illustration of heat flow field environment 200 and the different components in FIGS. 2 and 3 are not meant to imply physical or architectural limitations to the manner in which an illustrative example may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative example.

For example, aircraft heat control system 236 in FIG. 2 may include one or more boundary layer control devices, in addition or in place of, boundary layer control device 220. The additional boundary layer control devices may be associated with aircraft structure 206 or with other aircraft structures for aircraft 208.

One or more of the illustrative examples provides one or more technical solutions to a problem with heating of composite parts to extreme temperatures during operation of an aircraft. In one illustrative, boundary layer control device 220 changes distance 214 of heat flow field 202 to surface 204 of aircraft structure 206 by controlling thickness 218 of boundary layer 216.

The control of boundary layer 216 by boundary layer control device 220 is performed automatically in these illustrative examples. In other words, a controller or other mechanism is unnecessary to cause boundary layer control device 220 to move between stowed position 222 and deployed position 224.

Figure 4:
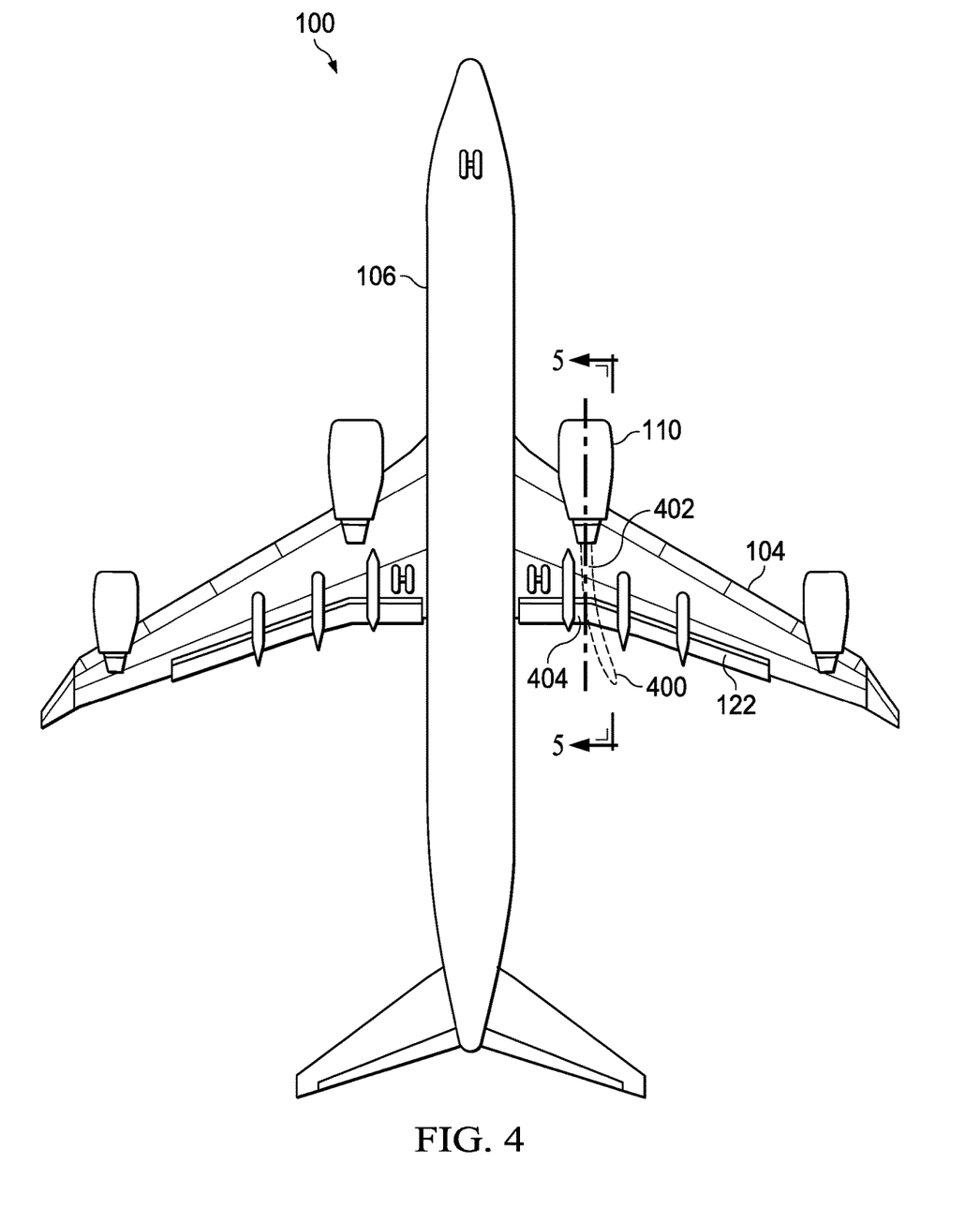
FIG. 4 is an illustration of a heat flow field in accordance with an illustrative example.

Turning now to FIG. 4, an illustration of a heat flow field is depicted in accordance with an illustrative example. In this example, a bottom side of a portion of aircraft 100 is depicted. In this example, aircraft engine 110 generates heat flow field 400. Heat flow field 400 flows over surface 402 of flap 122. Depending on the distance of heat flow field 400, delamination, disbonding, component degradation, or other inconsistencies may occur sooner than desired. This situation results in at least one or more of frequent maintenance, reduced performance, or other undesired effects in operating aircraft 100.

As depicted, boundary layer control device 404 is associated with flap 122. Boundary layer control device 404 is used to reduce the effects of heat flow field 400 on flap 122.

Figure 5:
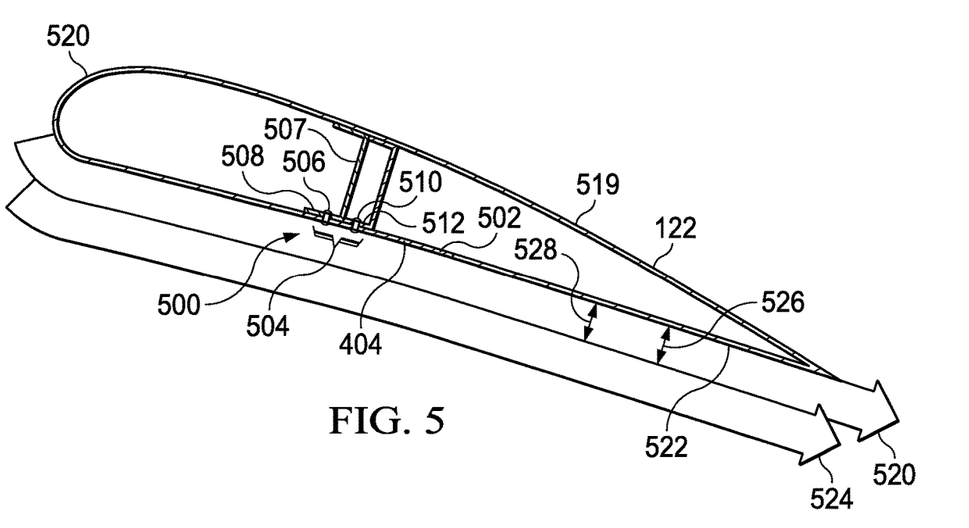
FIG. 5 is a cross-sectional view of a flap with a boundary layer control device in a stowed position in accordance with an illustrative example.

With reference now to FIG. 5, a cross sectional view of a flap with a boundary layer control device in a stowed position is depicted in accordance with an illustrative example. As depicted, cross sectional view in this example is along lines 5-5 in FIG. 4. In this depicted example, boundary layer control device 404 comprises engagement portion 500 and articulating portion 502. Engagement portion 500 and articulating portion 502 have dimensions that may be selected based on at least one of a strain on the articulating portion, a load on the aircraft structure, or some other factor or parameter.

Boundary layer control device 404 is connected to flap 122 by fastener system 504. In this example, fastener system 504 is connected to spar 507 inside of flap 122. For example, first row of fasteners 506 are fastened to flange 508 of spar 507. Second row of fasteners 510 is connected to section 512 of spar 507.

First row of fasteners 506 assists with loads when articulating portion 502, shown in the stowed position, moves into a deployed position. In the illustrative example, first row of fasteners 506 aid in reducing flap loads.

Further, dimensions for boundary layer control device 404 may be selected in a manner that avoids changes to outer mold line 519 of flap 122 while providing desired management of boundary layer 520.

As depicted, boundary layer 520 flows over surface 522 of flap 122. Heat flow field 524 flows at distance 526 from surface 522 of flap 122. Distance 526 of heat flow field 524 is based on thickness 528 of boundary layer 520.

Figure 6:
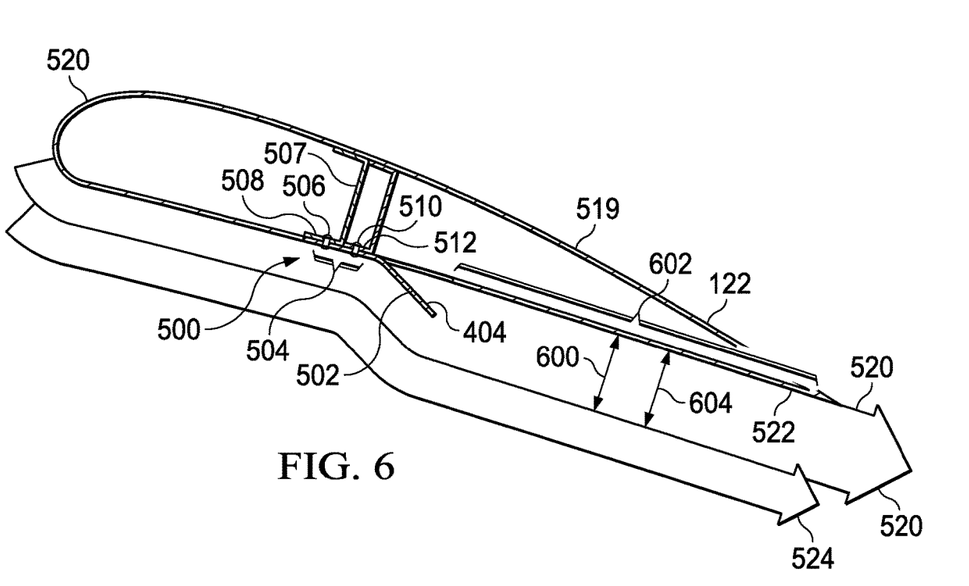
FIG. 6 is a cross-sectional view of a flap with a boundary layer control device in a deployed position in accordance with an illustrative example.

Turning now to FIG. 6, a cross sectional view of a flap with a boundary layer control device in a deployed position is depicted in accordance with an illustrative example. In this view, articulating portion 502 is in a deployed position. In this particular example, articulating portion 502 moves to a deployed position when the temperature of articulating portion 502 reaches a temperature that is equal to or greater than 100 degrees Celsius.

In this depicted example, thickness 600 of boundary layer 520 has increased in location 602. Thickness 600 increases as compared to thickness 528 in FIG. 5, with articulating portion 502 in the deployed position.

With the increase in thickness 600, distance 604 of heat flow field 524 is present in location 602. In this manner, the increase of distance 604 of heat flow field 524 reduces the temperature of surface 522 of flap 122 in location 602.

Figure 7:
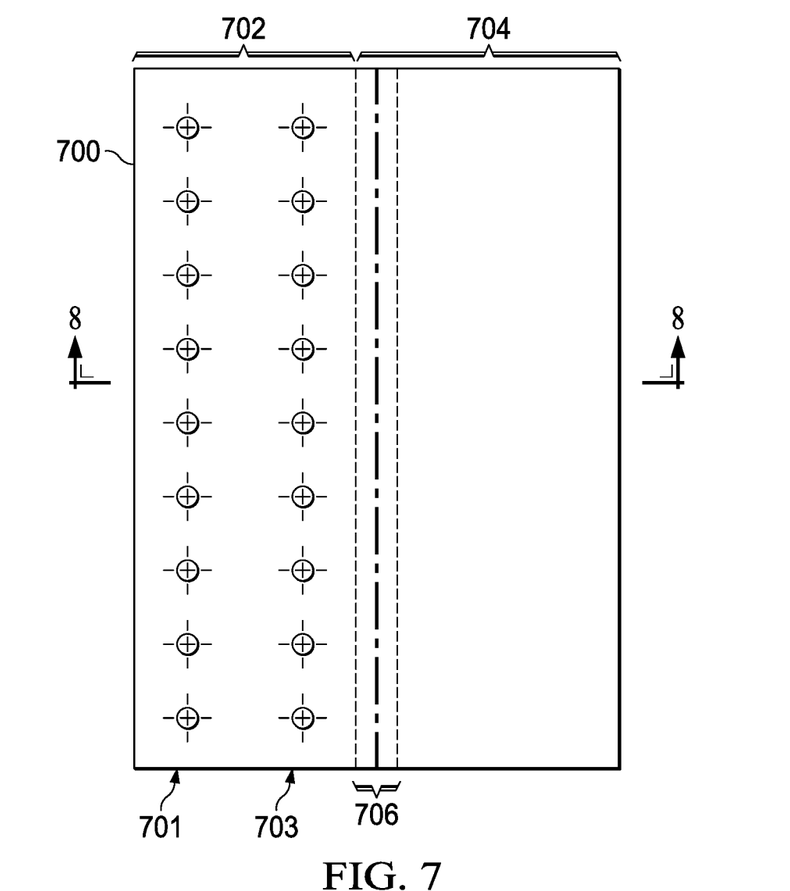
FIG. 7 is an illustration of a boundary control device in accordance with an illustrative example.

Turning to FIG. 7, an illustration of a boundary control device is depicted in accordance with an illustrative example. As depicted, boundary layer control device 700 is an example of a physical implementation of boundary layer control device 220 shown in block form in FIG. 2.

In this example, boundary layer control device 700 include engagement portion 702 and articulating portion 704. First row of locations 701 and second row of locations 703 are locations for fasteners that connect engagement portion 702 to an aircraft structure, such as a flap.

In this illustrative example, section 706 in articulating portion 704 is comprised of a shape memory material, such as nitinol. A portion of or all of section 706 may include the shape memory material. Section 706 causes articulating portion 704 to move between a stowed position, as shown here, and a deployed position.

The movement to the deployed position occurs when the temperature in section 706 in articulating portion 704 exceeds a threshold temperature. This threshold temperature is a first threshold temperature. When the temperature in section 706 in articulating portion 704 falls below a second threshold temperature, the articulating portion moves back to the stowed position.

In this illustrative example, the first threshold temperature and the second threshold temperature may be the same value. In another example, the second threshold temperature may be lower than the first threshold temperature.

Figure 8:
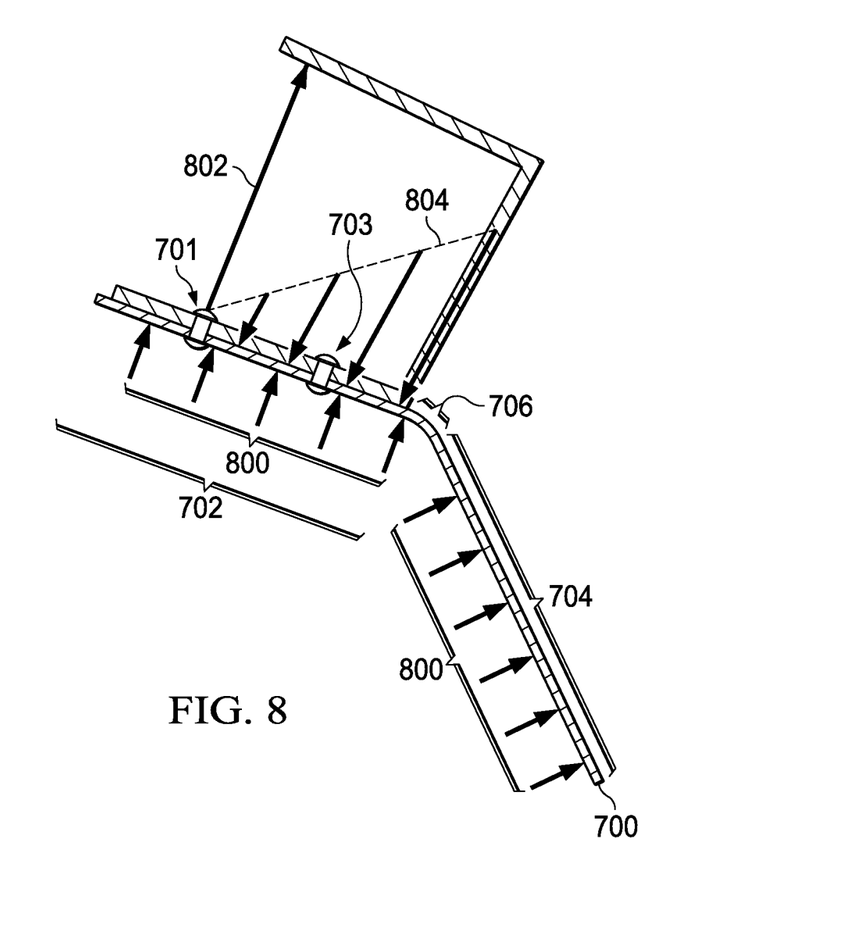
FIG. 8 is an illustration of forces for a boundary control device in accordance with an illustrative example.

With reference now to FIG. 8, an illustration of forces for a boundary control device are depicted in accordance with an illustrative example. In this example, a cross sectional view of a boundary layer control device 700 taken along lines 8-8 in FIG. 7 is shown.

In this view, pressure load 800 is present on boundary layer control device 700 during operation of the aircraft when boundary layer control device 700 is in the deployed position, as shown. Forward tension 802 is present for fasteners in first row of locations 701. Compression load 804 is present for fasteners in second row of locations 703. Both rows of fasteners in first row of locations 701 and second row of locations 703 also react to shear forces.

Figure 9:
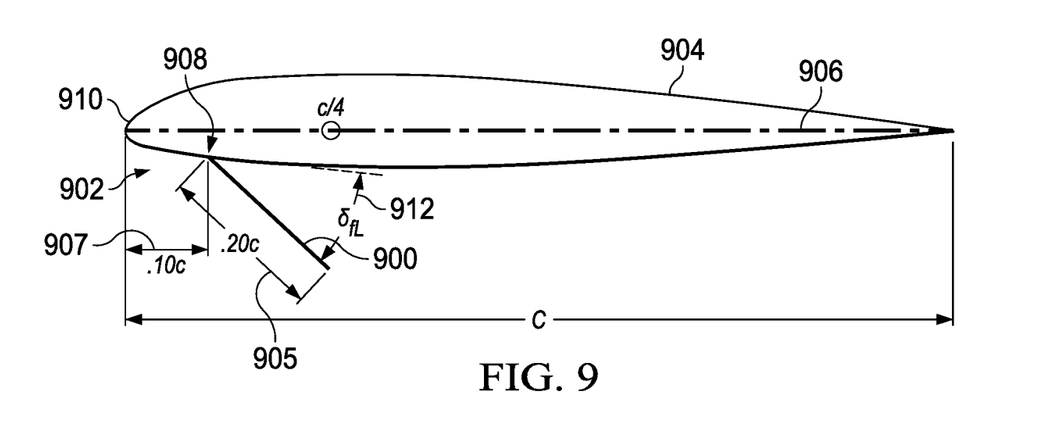
FIG. 9 is an illustration of parameters for designing a boundary layer control device in accordance with an illustrative example.

Turning to FIG. 9, an illustration of parameters for designing a boundary layer control device is depicted in accordance with an illustrative example. In this example, parameters are shown for articulating portion 900 in boundary layer control device 902 for flap 904. The value for length 905 of articulating portion 900 is a ratio of chord 906 for flap 904 represented by the variable "C". This ratio for length 905 is 0.20C. Distance 907 of end 908 of articulating portion 900 from leading edge 910 of flap 904 is 0.10C in this example. Angle 912 for articulating portion 900 in the deployed position is $\delta_{FL}$.

With these parameters, Device Chord 0.2C
Chordwise position 0.1C,
$\delta_{FL}$=30 deg deflection.

In the illustrative example, a chord line is a straight line connecting the leading and trailing edge of an airfoil. A chord length (c) is the length of the chord line. A chordwise position is a percentage of chord length as measured from 0 at the leading edge and 1 at the trailing edge. Also, a clean airfoil is an airfoil without an aerodynamic device altering the flow field. An example of a clean airfoil is a flap with the boundary layer control device in the stowed position.

Figure 10:
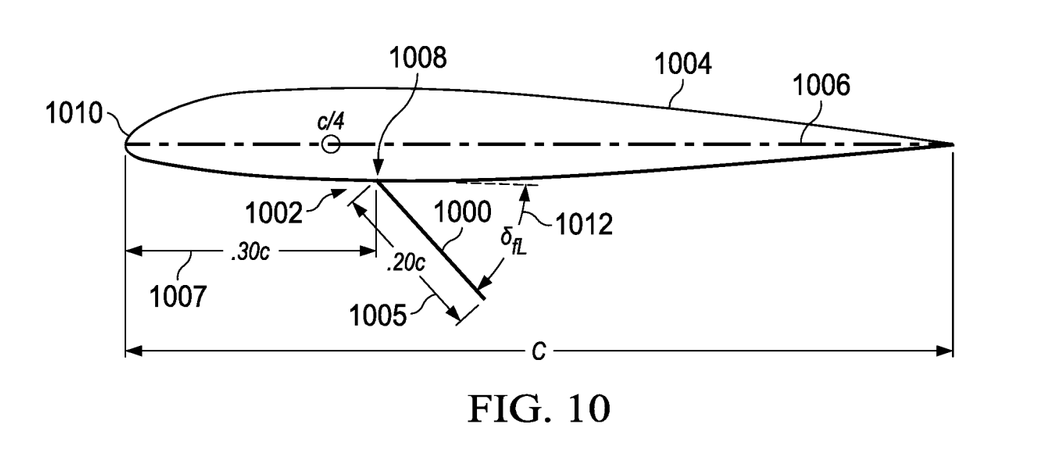
FIG. 10 is an illustration of parameters for designing a boundary layer control device in accordance with an illustrative example.

With reference to FIG. 10, an illustration of parameters for designing a boundary layer control device is depicted in accordance with an illustrative example. In this example, parameters are shown for articulating portion 1000 in boundary layer control device 1002 for flap 1004. Length 1005 of articulating portion 1000 has a value that is based on a ratio of chord 1006 for flap 1004 represented by the variable "C". This ratio for length 1005 is 0.20C. Distance 1007 of end 1008 from leading edge 1010 of flap 1004 is 0.30C in this example. Angle 1012 for articulating portion 1000 in the deployed position is $\delta_{FL}$.

With these parameters Device Chord 0.2C
Chordwise position 0.3C,
$\delta_{FL}$=30 deg deflection.

Figure 11:
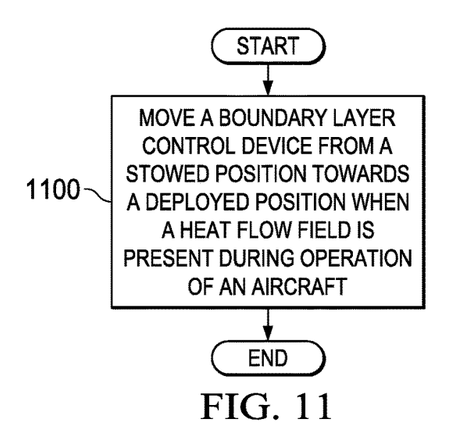
FIG. 11 is an illustration of a flowchart of a process for controlling a boundary flowing over an aircraft structure in accordance with an illustrative example.

Turning next to FIG. 11, an illustration of a flowchart of a process for controlling a boundary flowing over an aircraft structure is depicted in accordance with an illustrative example. The process illustrated in FIG. 11 may be implemented using boundary layer control device 220 shown in block form in FIG. 2.

The process begins by moving a boundary layer control device from a stowed position towards a deployed position when a heat flow field is present during operation of an aircraft. (operation 1100). The process terminates thereafter. In this example, the heat flow field may be adjacent to the aircraft structure.

The deployed position of the boundary layer control device increases a thickness of the boundary layer for the aircraft structure, that in turn increases a distance of the heat flow field from the aircraft structure during operation of the aircraft. The heat flow field may be generated by at least one of a heating element, an air brake, a vent outflow, an aircraft engine, of some other type of heating element.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
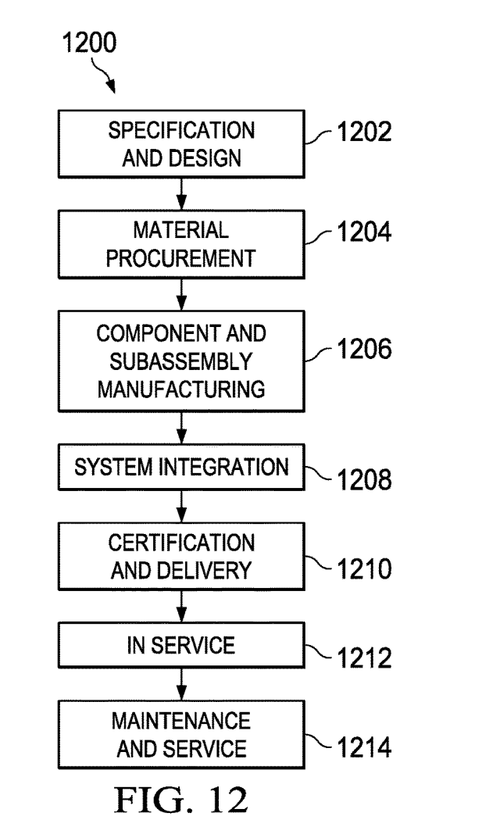
FIG. 12 is an illustration of an aircraft manufacturing and service method in accordance with an illustrative example.
Figure 13:
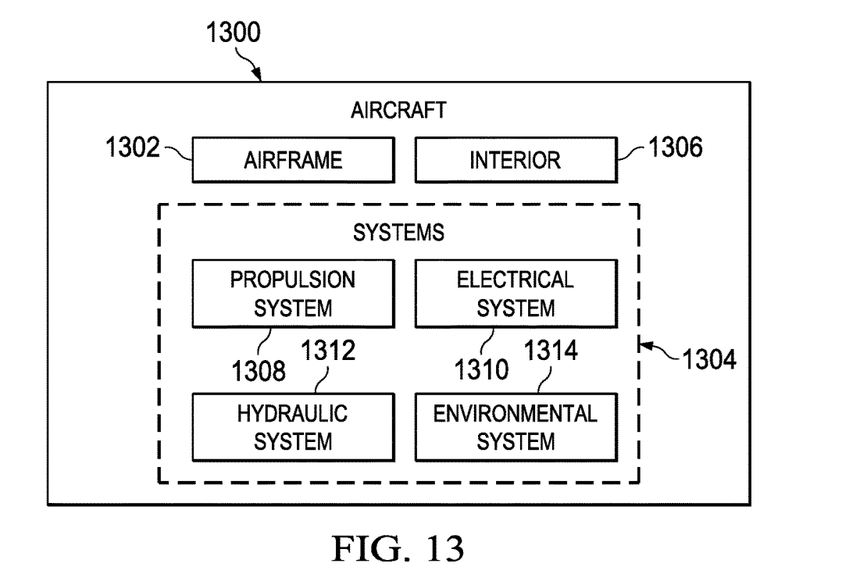
FIG. 13 is an illustration of an aircraft in which an illustrative example may be implemented.

Illustrative examples of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative example. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative example may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1200 in FIG. 12. For example, components for an aircraft heat control system may be produced in component and subassembly manufacturing 1206 in FIG. 12 or may be fabricated or manufactured and while aircraft 1300 is in service 1212 in FIG. 12. One or more apparatus examples, method examples, or a combination thereof may be utilized while aircraft 1300 is in service 1212 to deflect heat boundary layers away from aircraft structures such as flaps, stabilizers, or other aircraft structures that may be exposed to a heat boundary layer.

In another example, a boundary layer control device may be added to aircraft 1300 during routine maintenance and service 1214. This addition may be made as an upgrade or refurbishment of aircraft 1300. Thus, the use of a number of the different illustrative examples may substantially reduce maintenance needed for aircraft 1300.

Thus, the illustrative examples provide one or more solutions to controlling exposure of aircraft structures to undesired levels of heat. A boundary layer control device is used to manage the distance of the heat flow field from the surface of an aircraft structure. This distance may be managed by controlling the thickness of a boundary layer. In these illustrative examples, the operation of a boundary layer control device is performed automatically without needing a controller or other mechanism to actuate or cause boundary layer control device 220 to operate.

The description of the different illustrative examples has been presented for purposes of illustration and description and is not intended to be exhaustive or limited to the examples in the form disclosed. The different illustrative examples describe components that perform actions or operations. In an illustrative example, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples, with various modifications, as are suited to the particular use contemplated.

What is claimed is:

1. An apparatus that comprises:
an aircraft structure on an aircraft; and
a boundary layer control device fastened onto an exterior of the aircraft structure, such that the boundary layer control device comprises a stowed position and a deployed position and is configured to articulate from the stowed position to the deployed position that increases a thickness of a boundary layer for the aircraft structure in a manner that increases a distance of a heat flow field from the aircraft structure during operation of the aircraft.

2. The apparatus of claim 1, wherein the boundary layer control device is configured to move to the deployed position when a temperature of the boundary layer control device exceeds a threshold temperature.

3. The apparatus of claim 1, wherein the boundary layer control device in the deployed position has a configuration that performs an aerodynamic function.

4. The apparatus of claim 3, wherein the aerodynamic function is selected from a group consisting of increasing a local lift coefficient, shifting a local aerodynamic center of pressure, altering a local pitching moment coefficient, and increasing a local drag coefficient.

5. The apparatus of claim 1, wherein the boundary layer control device comprises:
a shape memory material.

6. The apparatus of claim 5, wherein the shape memory material is selected from at least one of a shape memory alloy, a copper-aluminum-nickel, a nickel titanium, a nitinol, or a shape memory ceramic.

7. The apparatus of claim 1, wherein the boundary layer control device comprises:
- an engagement portion; and
- an articulating portion extending from the engagement portion, wherein the articulating portion moves between the stowed position and the deployed position.

8. The apparatus of claim 7, wherein the boundary layer flows over the aircraft structure, and wherein the articulating portion is positioned relative to the aircraft structure such that the articulating portion in the deployed position increases the thickness of the boundary layer flowing over the aircraft structure in a location on the aircraft structure where heat from the heat flow field is undesirable.

9. The apparatus of claim 7, wherein the engagement portion is associated with the aircraft structure.

10. The apparatus of claim 1, wherein the heat flow field is generated by at least one of: an air brake, or a vent outflow.

11. The apparatus of claim 1, wherein the aircraft structure is selected from one of a flap, a flaperon, a vertical stabilizer, an aileron, a spoiler, and a horizontal stabilizer.

12. An aircraft heat control system that comprises:
- an engagement portion of a boundary layer control device to fastened onto an exterior of an aircraft structure; and
- an articulating portion of the boundary layer control device configured to extend from the engagement portion, such that the articulating portion is comprised of comprises a shape memory alloy configured to articulate from a stowed position towards a deployed position responsive to a heat flow field over the articulating portion such that a temperature of the articulating portion exceeds a threshold temperature, and wherein the articulating portion in the deployed position is configured to increase a thickness of a boundary layer and increase a distance of the heat flow field from the aircraft structure.

13. The aircraft heat control system of claim 12, wherein the threshold temperature is a first threshold temperature, and wherein the articulating portion moves from the deployed position towards the stowed position when the temperature is below a second threshold temperature.

14. The aircraft heat control system of claim 12, wherein the engagement portion is connected to the aircraft structure by at least one of a bonding system or a fastening system.

15. The aircraft heat control system of claim 12, wherein the engagement portion and the articulating portion have dimensions selected based on at least one of a strain on the articulating portion or a load on the aircraft structure.

16. The aircraft heat control system of claim 12, wherein the aircraft structure is a flap on a wing of an aircraft, and wherein the heat flow field is generated by an aircraft engine on the wing of the aircraft.

17. The aircraft heat control system of claim 12, wherein the shape memory alloy is selected from at least one of a copper-aluminum-nickel, a nickel titanium, or a nitinol.

18. The aircraft heat control system of claim 12, wherein the articulating portion in the deployed position has a configuration that performs an aerodynamic function.

19. The aircraft heat control system of claim 18, wherein the aerodynamic function is selected from a group consisting of increasing a local lift coefficient, shifting a local aerodynamic center of pressure, altering a local pitching moment coefficient, and increasing a local drag coefficient.

20. A method for preventing inconsistencies in an aircraft structure, the method comprising:
- moving a boundary layer control device fastened to an exterior of the aircraft structure from a stowed position towards a deployed position when a heat flow field is present adjacent to the aircraft structure during operation of an aircraft, and thereby increasing a thickness of a boundary layer for the aircraft structure and thereby increasing a distance of the heat flow field from the aircraft structure during operation of the aircraft.

21. The method of claim 20 further comprising:
- moving the boundary layer control device from the deployed position towards the stowed position when the heat flow field causes a temperature of the boundary layer control device to drop below a threshold temperature.

22. The method of claim 20, wherein the boundary layer control device comprises a shape memory alloy.

23. The method of claim 20, wherein the boundary layer control device comprises an engagement portion and an articulating portion, wherein the articulating portion moves between the stowed position and the deployed position.

24. The method of claim 23, wherein the articulating portion is positioned relative to the aircraft structure such that the articulating portion in the deployed position increases the thickness of the boundary layer flowing over the aircraft structure in a location on the aircraft structure where heat from the heat flow field is undesirable.

25. The method of claim 23, wherein the engagement portion is associated with the aircraft structure.

26. The method of claim 20, wherein the boundary layer control device in the deployed position has a configuration that performs an aerodynamic function.

27. The method of claim 26, wherein the aerodynamic function is selected from a group consisting of increasing a local lift coefficient, shifting a local aerodynamic center of pressure, altering a local pitching moment coefficient, and increasing a local drag coefficient.

* * * * *